United States Patent
Pusheck

(10) Patent No.: US 9,951,571 B2
(45) Date of Patent: Apr. 24, 2018

(54) GEAR BACKLASH ADJUSTMENT MECHANISM

(71) Applicant: Harnischfeger Technologies, Inc., Wilmington, DE (US)

(72) Inventor: Bernard W. Pusheck, Cudahy, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 75 days.

(21) Appl. No.: 15/053,790

(22) Filed: Feb. 25, 2016

(65) Prior Publication Data

US 2016/0251914 A1    Sep. 1, 2016

Related U.S. Application Data

(60) Provisional application No. 62/121,172, filed on Feb. 26, 2015.

(51) Int. Cl.
| | |
|---|---|
| *F16H 19/04* | (2006.01) |
| *F16H 19/08* | (2006.01) |
| *E21B 19/083* | (2006.01) |
| *F16H 57/12* | (2006.01) |

(52) U.S. Cl.
CPC ...... *E21B 19/083* (2013.01); *F16H 2057/126* (2013.01)

(58) Field of Classification Search
CPC ......... F16H 2057/125; F16H 2057/126; F16H 55/12; E21B 19/083; B25J 9/103
USPC .................................................... 74/409, 29
See application file for complete search history.

(56) References Cited

U.S. PATENT DOCUMENTS

| | | | |
|---|---|---|---|
| 2,404,865 A * | 7/1946 | Semar .................... | B63H 23/12 29/893.1 |
| 3,924,710 A | 12/1975 | Shohet | |
| 4,478,102 A * | 10/1984 | Ackermann .............. | C21C 5/50 266/245 |
| 4,539,854 A | 9/1985 | Bradshaw et al. | |
| 4,680,981 A | 7/1987 | Downing | |
| 5,408,940 A | 4/1995 | Winchell | |
| 6,523,647 B2 * | 2/2003 | Duplessis ............... | B66F 11/04 182/141 |
| 7,775,135 B2 | 8/2010 | Gabel et al. | |
| 2004/0107787 A1 | 6/2004 | Petrillo et al. | |
| 2010/0129013 A1 | 5/2010 | Schroeder et al. | |
| 2013/0213161 A1 | 8/2013 | Rombold et al. | |
| 2014/0124293 A1 | 5/2014 | Eversole et al. | |

FOREIGN PATENT DOCUMENTS

| | | |
|---|---|---|
| EP | 102511 | 3/1984 |
| GB | 2142410 | 1/1985 |

* cited by examiner

*Primary Examiner* — Jake Cook
(74) *Attorney, Agent, or Firm* — Michael Best & Friedrich LLP

(57) ABSTRACT

A drill rig includes a base, a drill tower extending from the base, a drill pipe coupled to and supported by the drill tower, and a driving mechanism coupled to the drill tower that moves the drill pipe relative to the drill tower. The driving mechanism includes a rack and a plurality of pinions that engage the rack. The drill rig also includes an adjustment mechanism coupled to the driving mechanism, the adjustment mechanism including a plurality of rollers and an adjustment component that moves the plurality of rollers simultaneously toward the pinions to contact the rack.

10 Claims, 6 Drawing Sheets

GEAR BACKLASH ADJUSTMENT MECHANISM

CROSS-REFERENCE TO RELATED APPLICATIONS

This application claims priority to U.S. Provisional Application No. 62/121,172, filed Feb. 26, 2015, the entire contents of which are incorporated herein by reference.

FIELD OF THE INVENTION

The present invention relates to drill rigs, and more specifically to an adjustment mechanism for a blasthole drill rig.

Blasthole drill rigs are commonly used in the mining industry to drill through hard rock. Blasthole drill rigs can be found, for example, in coal, copper, and diamond mines throughout the world. A blasthole drill rig typically includes a base, a drill tower (e.g., a mast) extending vertically from the base, a drill pipe or pipes that are coupled to and supported by the drill tower and extend into a borehole, a drill bit coupled to one end of the drill pipe or pipes within the borehole, a drill head coupled to the other end of the drill pipe or pipes, and a driving mechanism coupled to the drill tower that moves the drill head and associated drill pipe up and down in a controlled fashion relative to the drill tower.

SUMMARY

In accordance with one construction, a drill rig includes a base, a drill tower extending from the base, a drill pipe coupled to and supported by the drill tower, and a driving mechanism coupled to the drill tower that moves the drill pipe relative to the drill tower. The driving mechanism includes a rack and a plurality of pinions that engage the rack. The drill rig also includes an adjustment mechanism coupled to the driving mechanism, the adjustment mechanism including a plurality of rollers and an adjustment component that moves the plurality of rollers simultaneously toward the pinions to contact the rack.

In accordance with another construction, an adjustment mechanism includes a coupling member, a first threaded rod extending from the coupling member on one side of the coupling member, a second threaded rod extending from the coupling member on an opposite side of the coupling member, a first torque arm coupled to the first threaded rod, a second torque arm coupled to the second threaded rod, a first eccentric shaft coupled to the first torque arm, a second eccentric shaft coupled to the second torque arm, a first roller coupled to the first eccentric shaft, and a second roller coupled to the second eccentric shaft. Rotation of the coupling member causes the first and second rollers to move simultaneously in a single direction.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
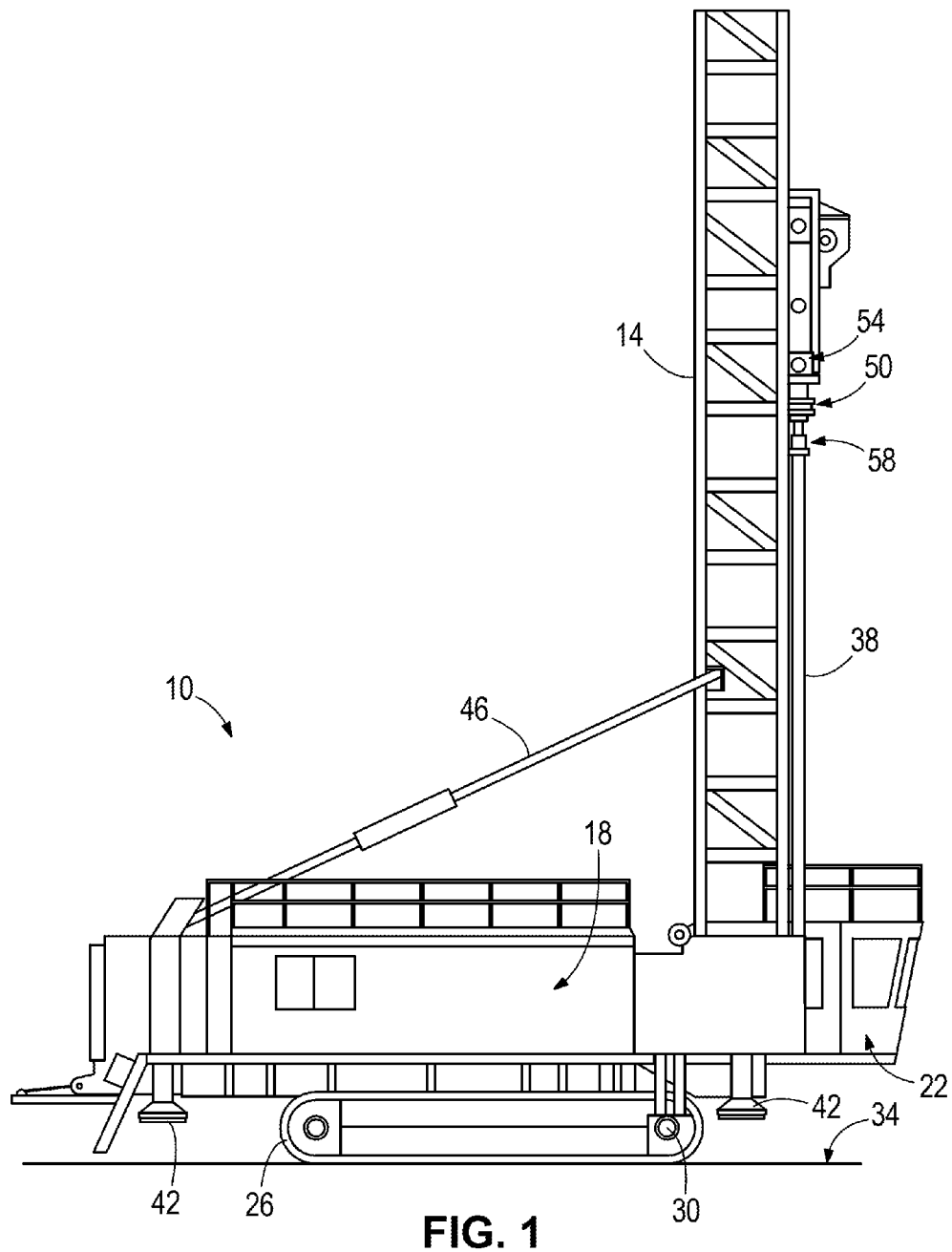
FIG. 1 is a schematic side view of a drill rig.

With reference to FIG. 1, a blasthole drill 10 is shown as having a drill tower 14, a base 18 (e.g., a machinery house) beneath the drill tower 14 that supports the drill tower 14, an operator's cab 22 coupled to the base 18, and crawlers 26 driven by a crawler drive 30 that drives the drill 10 along a ground surface 34. The drill tower 14 is coupled to and supports a drill pipe 38 and a drill bit (not shown) disposed at an end of the drill pipe 38. The drill pipe 38 and drill bit are configured to extend downward through the ground surface 34 and into a borehole (not shown). In some constructions, multiple drill pipes 38 are connected together to form an elongated drill string that extends into the borehole. The drill 10 also includes leveling jacks 42 to support the drill 10 on the surface 34, and a brace 46 that supports the drill tower 14 on the machinery house 18.

With continued reference to FIG. 1, the drill 10 includes a drill head 50, a driving mechanism 54 coupled to the drill head 50, and an intermediate coupling 58 coupled to both the drill head 50 and the drill pipe 38. The driving mechanism 54 drives the drill head 50 to move the drill pipe 38 relative to the drill tower 14 (e.g., vertically up and down and into and out of the borehole).

Figure 2:
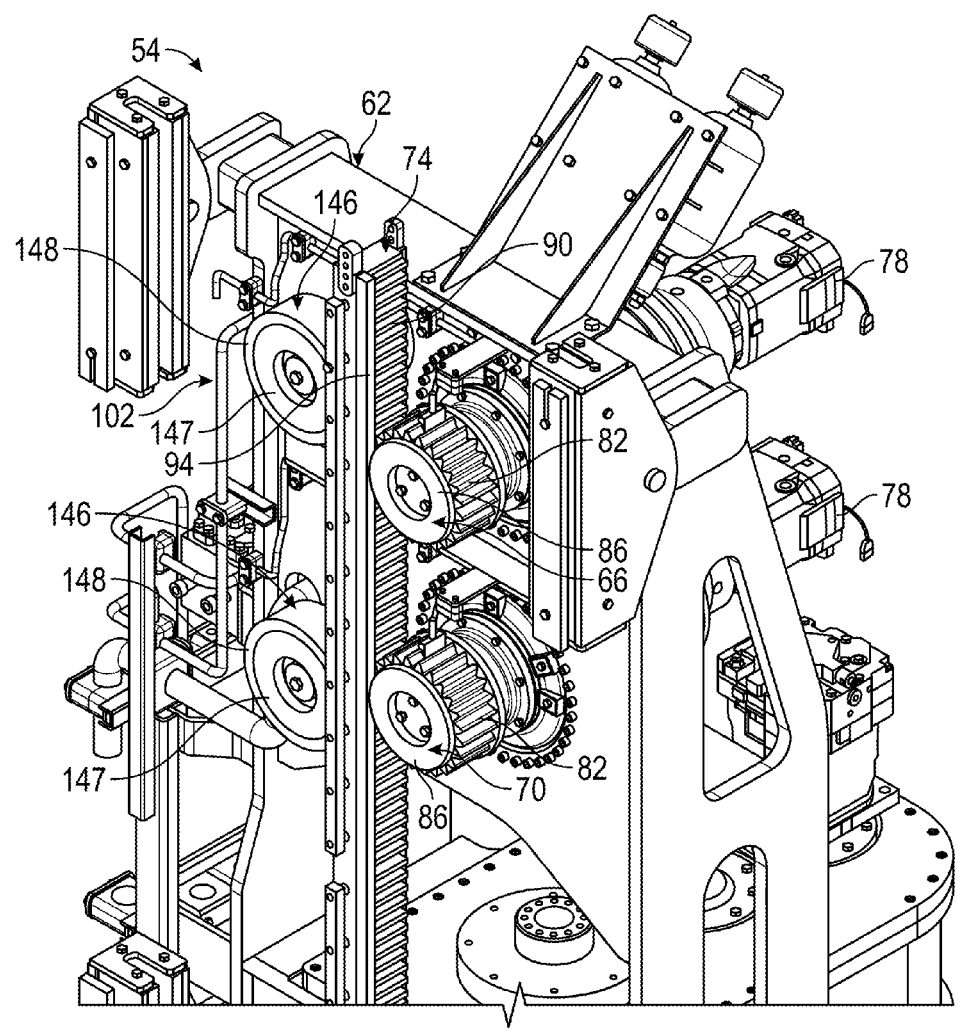
FIG. 2 is a perspective view of a driving mechanism and a adjustment mechanism according to one construction for use on the drill rig of FIG. 1.
Figure 3:
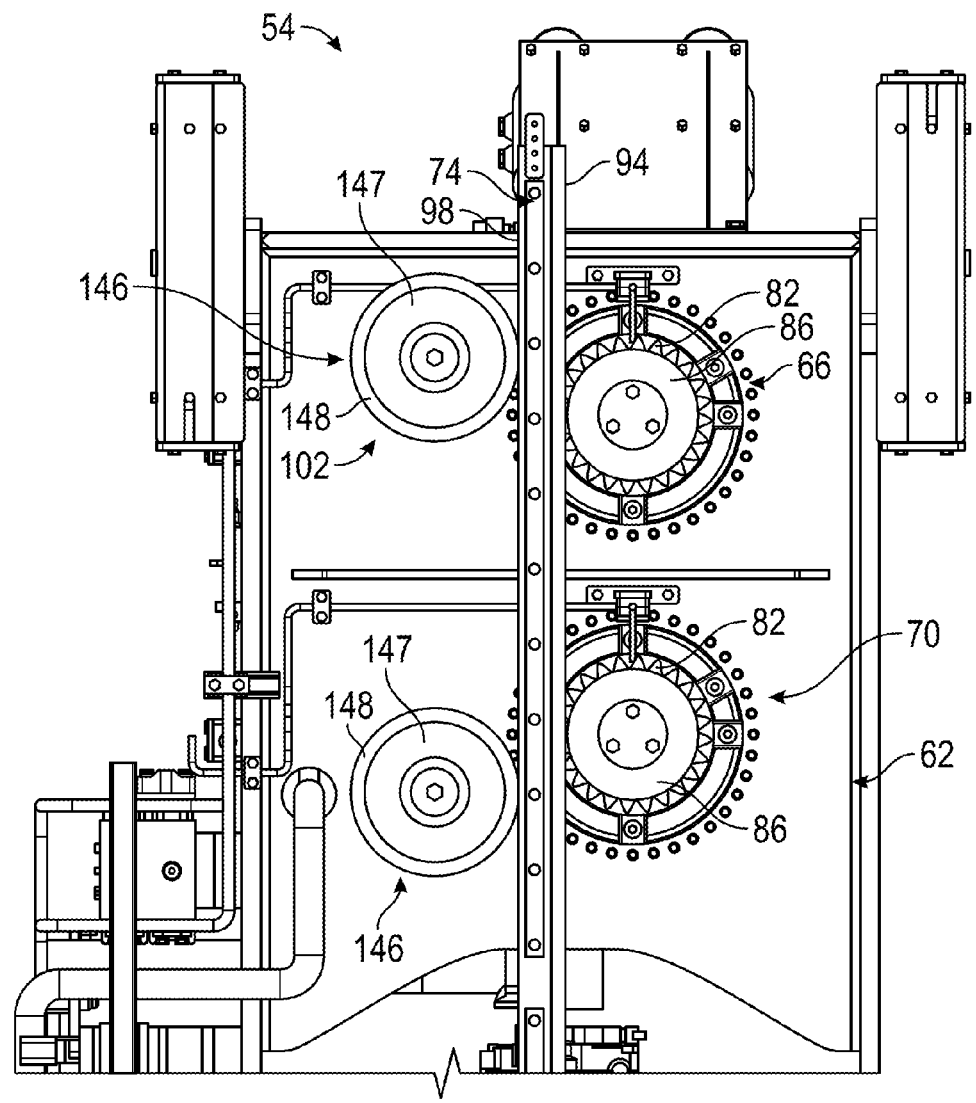
FIG. 3 is a front view of the driving mechanism and mechanism.
Figure 4:
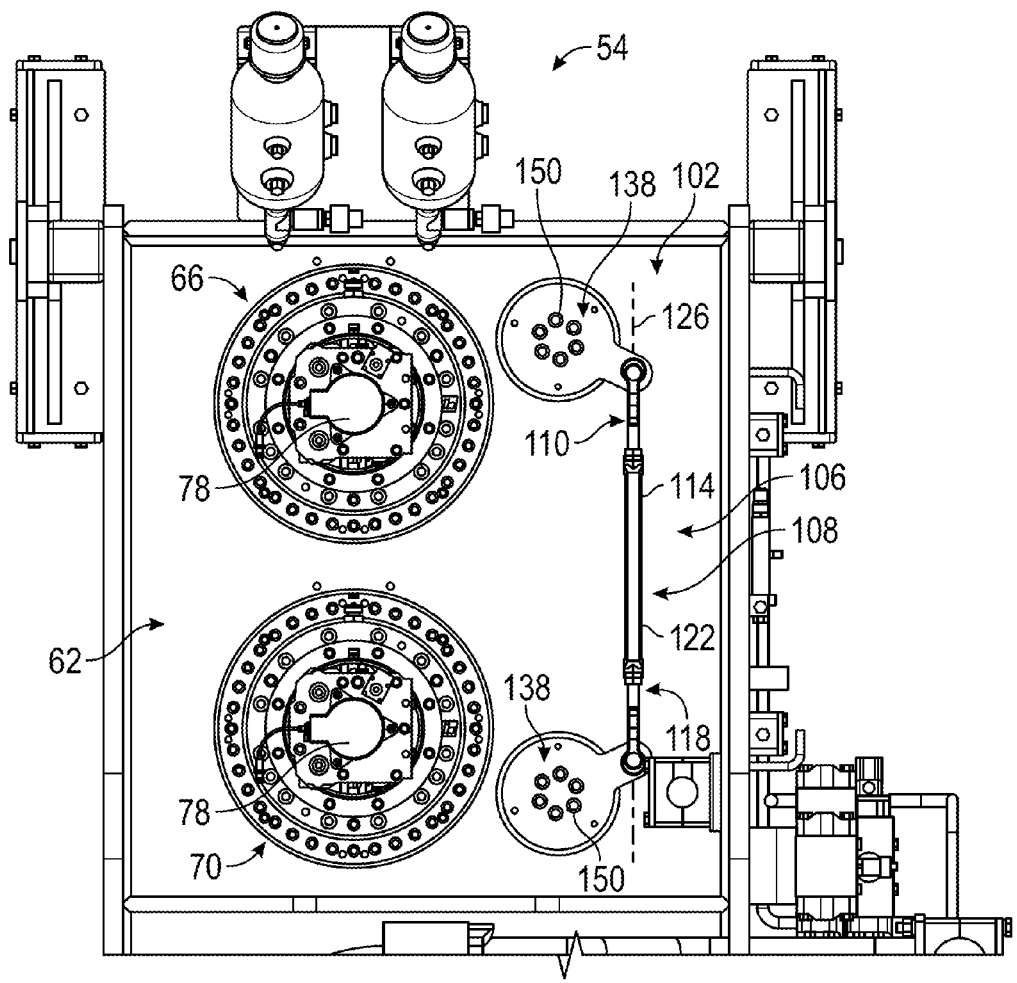
FIG. 4 is a rear view of the driving mechanism and mechanism.

With reference to FIGS. 2-5, the driving mechanism 54 includes a frame 62 (e.g., a carriage), a first pinion 66 coupled to the frame 62, a second pinion 70 coupled to the frame 62, and a single rack 74 (FIGS. 2 and 3) coupled to and driven by the pinions 66, 70. As illustrated in FIGS. 2 and 4 the pinions 66, 70 are driven rotationally by motors 78 that are coupled to the frame 62. The rack 74 is coupled (e.g., directly affixed) to the drill head 50, such that movement of the rack 74 (e.g., vertical movement) causes movement of the drill head 50 (e.g., vertical movement).

With reference to FIGS. 2 and 3, each of the pinions 66, 70 includes a toothed surface 82, as well as at least one gap plate 86 disposed axially from the toothed surface 82. The rack 74 includes a toothed surface 90 (FIG. 2) that meshes with and contacts the toothed surfaces 82 of the pinions 66, 70 to drive the rack 74. The rack 74 also includes a first, flat contact surface 94 and a second, flat contact surface 98. The first, flat contact surface 94 (FIGS. 2 and 3) is disposed adjacent the toothed surface 90 of the rack 74, and is engaged (e.g., abutted) by the gap plates 86 on the pinions 66, 70, so as to maintain a desired spacing between the toothed surfaces 82, 90 of the pinions 66, 70 and the rack 74. The second, flat contact surface 98 (FIG. 3) is disposed opposite the first, flat contact surface 94.

As illustrated in FIGS. 2-5, in the illustrated construction, the pinions 66, 70 are disposed vertically in line with one another such that the first pinion 66 is disposed directly above the second pinion 70, and such that the rack 74 is driven vertically up and down alongside the pinions 66, 70 by the meshing and contacting of the toothed surfaces 82, 90. Other constructions include different arrangements.

With continued reference to FIGS. 2-5, the drill 10 further includes an adjustment mechanism 102 that facilitates and maintains engagement between the toothed surfaces 82, 90 of the pinions 66, 70 and the rack 74, despite wear along one or more of the toothed surfaces 82, 90, the gap plates 86, and the first and second flat contact surfaces 94, 98. The adjustment mechanism 102 prevents or inhibits gear backlash.

Figure 5:
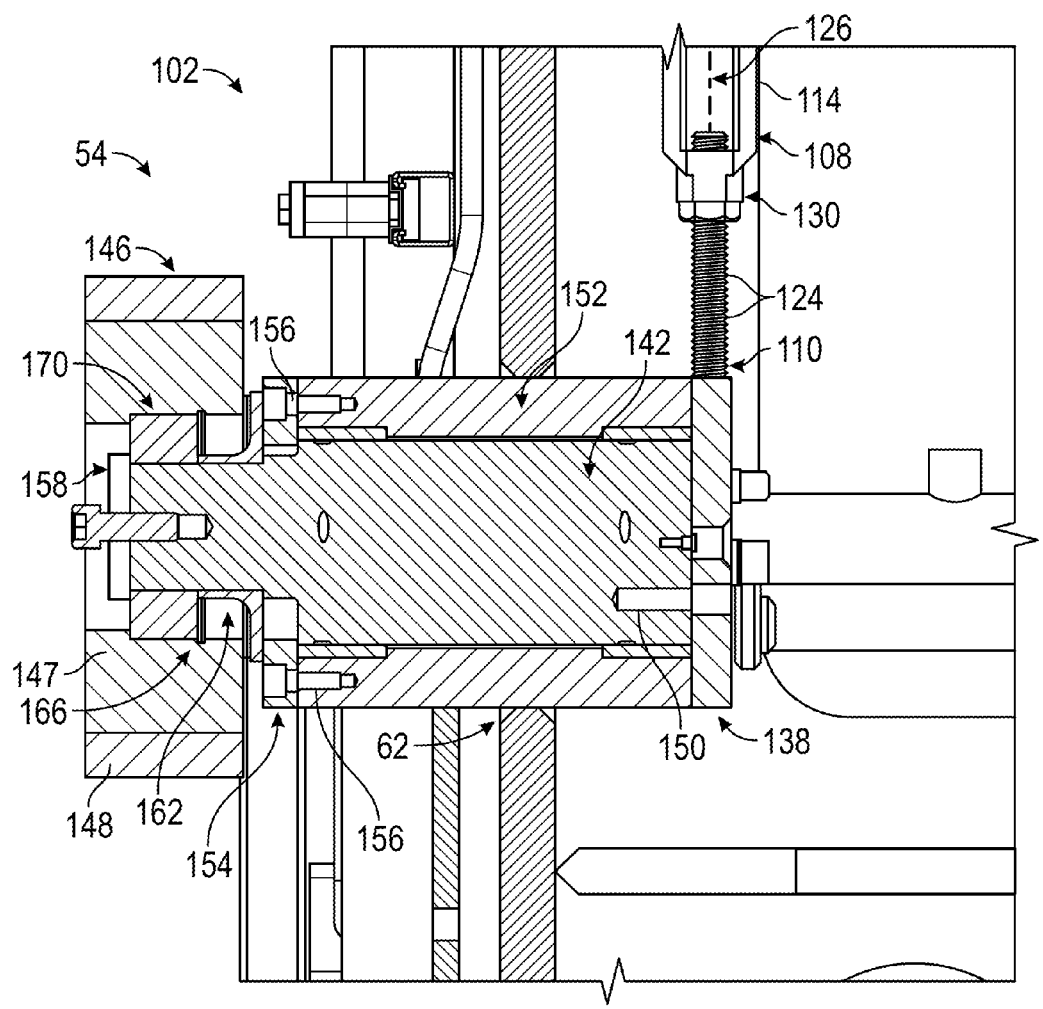
FIG. 5 is a cross-sectional view of a portion of the mechanism.

As illustrated in FIGS. 4 and 5, the adjustment mechanism 102 includes an adjustment component 106. The adjustment component 106 is a mechanism that both lengthens and shortens in length to move torque arms away from or toward each other. For example, in the illustrated construction, the adjustment component 106 includes a coupling member 108 (e.g., a turnbuckle), a first rod 110 extending from a first end 114 of the coupling member 108, and a second rod 118 extending from a second, opposite end 122 of the coupling member 108. As illustrated in FIG. 5, the rods 110, 118 include exterior threads 124 (e.g., along all or substantially all of the rods 110, 118). The first and second ends 114, 122 of the coupling member 108 have openings with interior threads (not shown) to receive the exterior threads 124 of the first and second rods 110, 118. The exterior and interior threads are arranged such that when the coupling member 108 is twisted in a first direction about an axis 126 extending between the first and second ends 114, 122, the rods 110, 118 move linearly away from one another along the axis 126 at the same rate. When the coupling member 108 is twisted in a second, opposite direction about the axis 126, the rods 110, 118 move linearly toward one another along the axis 126 at the same rate. As illustrated in FIG. 5, in some constructions, a jam nut 130 is disposed on each of the rods 110, 118. The jam nuts 130 abut the first and second ends 114, 122 of the coupling member 108 to prevent self loosening of the rods 110, 118.

With continued reference to FIGS. 2-5, in the illustrated construction, each of the rods 110, 118 is coupled to a torque arm 138 (FIGS. 4 and 5). Each torque arm 138 is coupled to an eccentric shaft 142 (FIG. 5), and each eccentric shaft 142 is coupled to a roller 146 (FIGS. 2, 3, and 5). In the illustrated construction, each roller 146 includes a steel hub 147 and a roller surface layer 148 (e.g., polyurethane layer) around an outer diameter of the steel hub 147. Other constructions include different materials. Each of the torque arms 138 is coupled to one of the eccentric shafts 142 with one or more set screws 150 (FIGS. 4 and 5), which support the weight of the coupling member 108 and the rods 110, 118.

With reference to FIGS. 2 and 3, the rollers 146 are configured to engage the second contact surface 98 on the rack 74. For example, when the coupling member 108 is twisted in the first direction about the axis 126, the rods 110, 118 move away from one another at the same rate, causing the torque arms 138 to also swing away from one another at the same rate. Movement of the torque arms 138 away from one another at the same rate causes the rollers 146 (and the rack 74) to move in a direction toward the pinions 66, 70 at the same rate, pressing against the second, flat contact surface 98. In the illustrated construction, the rollers 146 move in a direction that is transverse to the axis 126, such that the rack 74 is pressed between the rollers 146 and the pinions 66, 70 with an equal or substantially equal force applied from each roller 146. In the illustrated construction, each roller 146 is disposed generally opposite that of one of the pinions 66, 70.

With reference to FIG. 5, in the illustrated construction, the eccentric shaft 142 is disposed at least partially within and rotates within a stationary shaft housing 152. In some constructions the shaft housing 152 includes one or more bushings (e.g., one bushing on each end of the shaft housing 152) to facilitate rotation of the eccentric shaft 142. The shaft housing 152 is coupled (e.g., mounted) to the frame 62. An end plate 154 is coupled (e.g., fastened) to the shaft housing 152 with fasteners 156, and restrains axial movement of the eccentric shaft 142. A keeper plate 158 is coupled (e.g., fastened) to the eccentric shaft 142. A spacer 162 and a snap ring 166 are also coupled to the eccentric shaft 142 and are disposed between the end plate 154 and the keeper plate 158. A sealed bearing 170 is coupled to the eccentric shaft 142 and the roller 146. The sealed bearing 170 facilitates rotation of the roller 146 about an axis that is perpendicular to the axis 126.

With reference to FIGS. 2 and 3, over time the roller surface layer 148 wears down due to friction that is generated during operation of the driving mechanism 54. Additionally, the gap plates 86, as well as the first and second contact surfaces 94, 98 also experience some wear. The wearing of these components can reduce the degree of contact or meshing of the toothed surfaces 82, 90, thereby compromising the ability of the driving mechanism 54 to operate efficiently and effectively. In order to maintain a desired level of meshing and contact, the toothed surfaces 82, 90 are moved closer to one another with the adjustment mechanism 102. The adjustment mechanism 102 thus helps to maintain a tight, continuous contact between the toothed surfaces 82, 90, such that the drive mechanism 54 can continue to operate efficiently.

In some constructions, an initial backlash setting is provided (i.e., an initial positioning of the rollers 146 to maintain the desired meshing and contact between the toothed surfaces 82, 90). As the roller surface layer 148 begins to wear from contact with the contact surface 98, the backlash setting is changed by using the adjustment mechanism 102 to move the rollers 146 closer to the pinions 66, 70.

In some constructions, the adjustment mechanism 102 is operable to move the rollers 146 between approximately 8 mm and 12 mm from a first position away from the pinions 66, 70 to a second position closer to the pinions 66, 70. In some constructions, the adjustment mechanism 102 is operable to move the rollers 146 approximately 10 mm from a first position away from the pinions 66, 70 to a second position closer to the pinions 66, 70. Other constructions include different ranges and values. In some constructions, the first position is a position where the toothed surfaces 82, 90 are no longer in contact with one another. In other constructions, the first position is a position in which at least a portion of one or more of the toothed surfaces 82, 90 are still in contact with one another, such that movement of the rollers 146 to the second position causes greater surface contact between the one or more toothed surfaces 82, 90, and/or further engagement between additional toothed surfaces 82, 90 on the pinions 66, 70. In some constructions, the first position is a position in which the rollers 146 are no longer engaged with the second contact surface 98. In other constructions, the rollers 146 are engaged with the second contact surface 98 in both the first and second positions.

With reference to FIGS. 2-5, in the illustrated construction, the adjustment mechanism 102 advantageously requires only the manipulation of a single component (i.e., the coupling member 108) to cause movement of multiple rollers 146 in the same direction. Thus, rather than making multiple adjustments, a single adjustment is used to tighten the spacing between the single rack 74 and multiple pinions 66, 70. This saves the end user valuable down time. Additionally, through use of the coupling member 108, the threaded rods 110, 118, and the torque arms 138, there are an infinite number of set points (i.e., positions of the rollers 146). Thus, adjustment of the rollers 146 can conveniently be fine-tuned as desired, enhancing the performance of the driving mechanism 54.

In some constructions, the adjustment component 106 includes a hydraulic cylinder or cylinders in place of the coupling member 108 and rods 110, 118. The hydraulic cylinder is coupled to the torque arms 138, and operates to generate movement of the torque arms 138 and rollers 146 as described above, such that when the hydraulic cylinder moves in a first direction the rollers 146 move towards the pinions 66, 70, and when the hydraulic cylinder moves in a second, opposite direction the rollers 146 move away from the pinions 66, 70.

In some constructions, separate hydraulic cylinders, separate coupling members, or a combination thereof are provided, one for each pinion 66, 70, such that each hydraulic cylinder or coupling member separately activates movement of just one roller 146 toward and away from one of the pinions 66, 70. Other constructions include different arrangements and combinations of coupling members, hydraulic cylinders, and/or other types of adjustment components.

In some constructions, the positioning of one or more of the rollers 146 is adjusted incrementally. For example, and with reference to FIG. 5, in some constructions, at least one of the end plates 154 is mounted to or forms part of one of the eccentric shafts 142, such that the end plate 154 rotates with the eccentric shaft 154. In these constructions, both the end plate 154 and the shaft housing 152 include one or more openings (e.g., one or more through holes in the end plate 154 and a series of drilled and tapped holes in the shaft housing 152). When the eccentric shaft 142 is rotated, one of the openings on the end plate 154 rotates with the eccentric shaft 142 and eventually aligns with one of the openings on the fixed shaft housing 152. When the openings are aligned as desired, a fastener may be inserted into the openings to lock a relative rotational position of the end plate 154 (and consequently a position of the eccentric shaft 142 and the roller 146). This allows the positioning of the roller 146 to be moved incrementally toward and away from the pinion 66 by predetermined distances.

Figure 6:
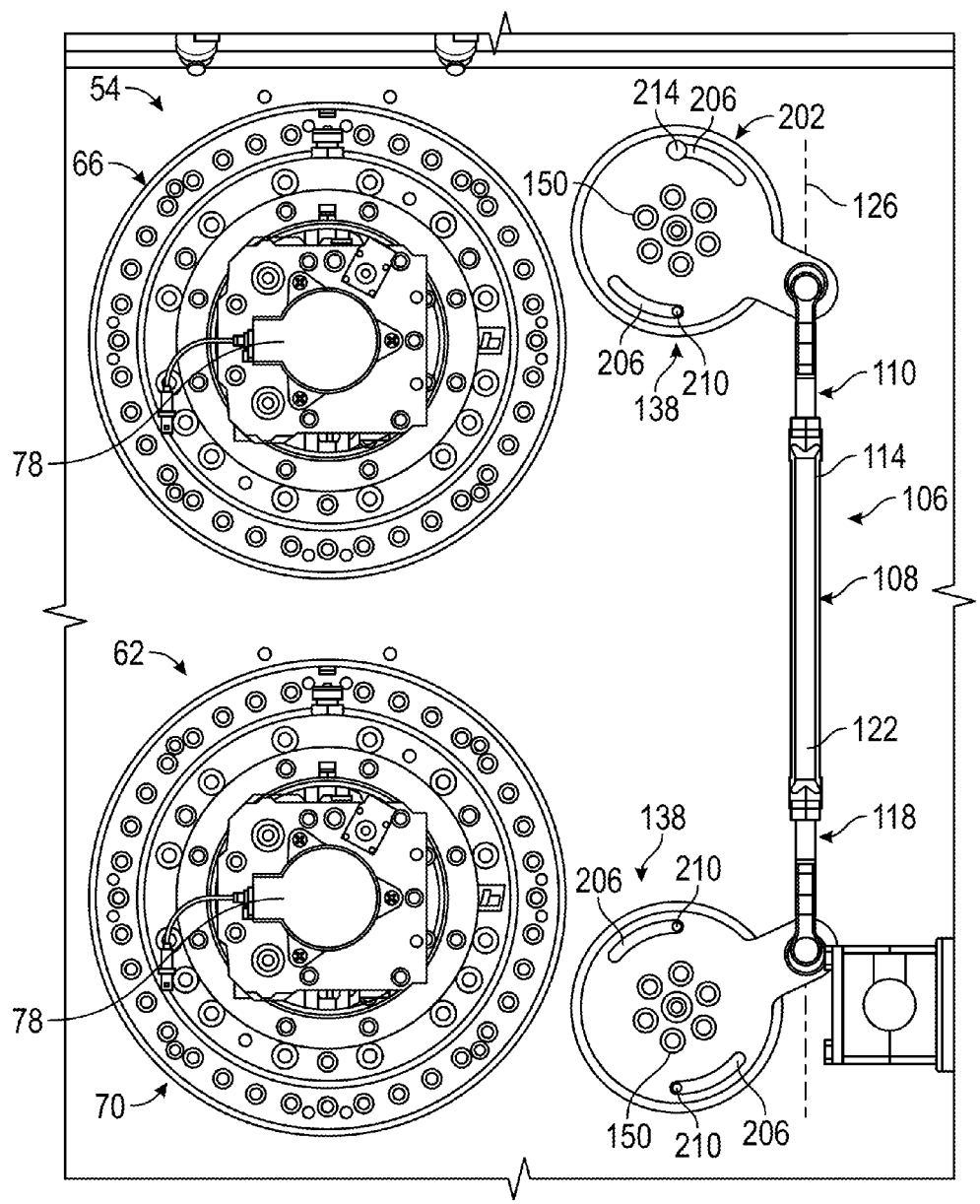
FIG. 6 is a rear view of another construction of a driving mechanism and adjustment mechanism.

With reference to FIG. 6, in yet another construction, an adjustment mechanism 202 includes at least one opening 206 within one of the torque arms 138. In the construction illustrated in FIG. 6, each torque arm 138 includes two openings 206 in the form of arcuate slots. The openings 206 provide access to the fixed shaft housing 152 behind the torque arms 138, and to one or more openings 210 (e.g., threaded) in the shaft housing 152. Fasteners 214 (e.g., threaded) may be inserted into the openings 206, 210 (one fastener 214 is illustrated in FIG. 6). When the fasteners 214 are tightened, the heads of the fasteners 214 press against the torque arms 138 and fix a rotational position of the torque arms 138 relative to the shaft housing 152, thereby fixing a position of the rollers 146. The position of the rollers 146 may then be adjusted again by loosening the fasteners 214 out of the openings 210 in the shaft housing 152 and manipulating the adjustment component 108 (e.g., turning the coupling member 108) as desired, allowing the fasteners 214 to slide within the openings 206 (e.g., along the slots) until a different rotational position is obtained. Once the different rotational position is obtained, the fasteners 210 are then re-inserted into the openings 210 to again lock a position of the rollers 146.

Although the invention has been described in detail with reference to certain preferred embodiments, variations and modifications exist within the scope and spirit of one or more independent aspects of the invention as described.

What is claimed is:

1. An adjustment mechanism comprising:
   a coupling member;
   a first threaded rod extending from the coupling member on one side of the coupling member;
   a second threaded rod extending from the coupling member on an opposite side of the coupling member;
   a first torque arm coupled to the first threaded rod;
   a second torque arm coupled to the second threaded rod;
   a first eccentric shaft coupled to the first torque arm;
   a second eccentric shaft coupled to the second torque arm;
   a first roller coupled to the first eccentric shaft; and
   a second roller coupled to the second eccentric shaft;
   wherein rotation of the coupling member causes the first and second rollers to move simultaneously in a single direction.

2. The adjustment mechanism of claim 1, further comprising a stationary shaft housing disposed at least partially around the first eccentric shaft and an end plate coupled to the first eccentric shaft that rotates with the first eccentric shaft.

3. The adjustment mechanism of claim 2, wherein the end plate and the stationary housing both include openings to receive a fastener to lock a rotational position of the first eccentric shaft.

4. The adjustment mechanism of claim 1, wherein the first torque arm includes an arcuate slot and a fastener that extends through the arcuate slot.

5. The adjustment mechanism of claim 1, further comprising a stationary shaft housing disposed at least partially around the first eccentric shaft, wherein the fastener is configured to extend into the stationary shaft housing to lock a rotational position of the first eccentric shaft.

6. The adjustment mechanism of claim 1, wherein the first roller and the second roller are each movable between about 8 mm and about 12 mm along the single direction.

7. The adjustment mechanism of claim 1, wherein the first roller and the second roller each include a steel hub and a polyurethane surface layer.

8. The adjustment mechanism of claim 1, wherein rotation of the coupling member causes the first torque arm to rotate in a first direction and causes the second torque arm to rotate in an opposite direction.

9. The adjustment mechanism of claim 1, wherein the first eccentric shaft is coupled to the first torque arm with a plurality of set screws.

10. A method of adjusting on a drill rig using the adjustment mechanism of claim 1, the method comprising:
    rotating the coupling member to cause the first and second rollers to move toward and engage a toothed rack on the drill rig; and
    locking a rotation of the first and second eccentric shafts.

* * * * *